April 24, 1956 H. G. SCHWARZ 2,743,313
TELEVISION SIGNAL GAIN AS FUNCTION OF BRIGHTNESS
Original Filed June 13, 1950 2 Sheets-Sheet 1

INVENTOR.
HANS G. SCHWARZ
BY [signature]
ATTORNEY.

TELEVISION SIGNAL GAIN AS FUNCTION OF BRIGHTNESS

Original Filed June 13, 1950 2 Sheets-Sheet 2

INVENTOR.
HANS G. SCHWARZ
BY Alden D. Redfield
ATTORNEY.

United States Patent Office 2,743,313

Patented Apr. 24, 1956

2,743,313

TELEVISION SIGNAL GAIN AS FUNCTION OF BRIGHTNESS

Hans G. Schwarz, Cincinnati, Ohio, assignor to Avco Manufacturing Corporation, Cincinnati, Ohio, a corporation of Delaware Original application June 13, 1950, Serial No. 167,906, now Patent No. 2,672,505, dated March 16, 1954. Divided and this application April 28, 1953, Serial No. 351,691

2 Claims. (Cl. 178—7.5)

The invention involved in this application, which is a division of my co-pending application, Serial No. 167,906, filed on June 13, 1950, and issued on March 16, 1954 as United States Patent 2,672,505, relates to television systems and particularly to the contrast characteristics thereof. More specifically, the present invention relates to video frequency amplifiers having a dynamic gain controlling circuit which increases the permissible reproduction contrast.

The physiological reaction of the human eye plays an all-important part in determining the apparent reproduction fidelity of a television receiver. Accordingly, in a reproduced scene which is practically all white the most interesting information, as far as the observer is concerned, is in the black and gray regions, while in a picture scene which is predominately dark, bright highlights are very important in giving the reproduced image a necessary contrast pleasing to the observer. Prior art circuits have recognized this fact and have provided controls so that the observer can adjust reproduction contrast. However, the maximum brightness, and thus the maximum contrast of the reproduced image, is limited by the amount of second anode current safely available in the high potential power supply circuit and the maximum safe second anode current rating of the cathode ray tube.

In regard to the high potential power supply, the average commercial receiver uses a so-called "fly-back" potential source or "kick-back" high voltage source to supply picture tube second anode current. Unfortunately, as far as contrast is concerned, in this type of circuit the power available is strictly limited, and the maximum second anode current allowed to be drawn must be judiciously restricted. The added efficiency of using the collapsing magnetic field in the horizontal deflection generator as a power source, hence the name fly-back, is offset to some extent by the limited amount of power that is available because too great a second anode current demand diminishes the amount of power available from this source for other deflection purposes. This limitation is important in that the maximum amount of second anode current that can safely be drawn determines the maximum average brightness of the reproduced image on the cathode ray tube screen, and prior art circuits which keep the D. C. component in the picture signal as protection against overloading have held the available intermittent peak brightness to the same value as the permissible maximum average brightness which maximum average brightness corresponds to the amount of second anode current drawn by an all white picture of peak brilliance.

In other words, a constant all white picture draws a constant high amount of second anode current. If the white portion of the picture signal is at the brightest or highest white level, then the second anode current drain is constant and at a maximum. We say this picture has the highest maximum average brightness that can be reproduced. As stated, a picture of this type places a maximum drain on the second anode current supply source. However, peak highlights which desirably could be brighter cause only an intermittent rather than a constant drain on the second anode current source. Ignoring this difference in power demand prior art circuits have established a highlight peak brightness level or maximum amount of second anode current that can be drawn, which is equal to the second anode current that can safely be drawn for a high level completely white picture. Thus, prior art circuits completely overlook the intermittent nature of the drain on the second anode current source during highlight peaks in an average picture.

Other prior art circuits have avoided this type of brightness limitation by recreasing the percentage of D. C. restoration used. In circuits without a D. C. restorer and where the signal fed to the grid of the cathode ray tube is without a D. C. component, an all white picture so centers itself on the grid as to draw lower second anode current for maximum peak brightness than it would if it had a D. C. component. This results because the black level, i. e., the lowest black portion of the image signal, drives into the blacker-than-black region, reducing the positive swing of the signal and thus reducing the peak brightness of the reproduced image. However, when a predominately dark background signal having low average brightness is impressed upon the grid of the cathode ray tube, the black portion of the signal is reproduced as a gray, and the peak high light components draw considerable second anode current over and above the maximum available average second anode current, thereby appearing very bright on the cathode ray tube screen. In other words, by eliminating the D. C. restorer circuit completely or in part, the brightness of the high light peaks in a dark picture scene can exceed considerably the maximum average brightness, resulting in an increased reproduction contrast. This is possible because the difference in signal demand automatically tends to protect the source of second anode current and not overload the cathode ray tube.

The primary drawback of eliminating the D. C. restorer circuit is noticed when scenes having a very high or very low average brightness are reproduced. There is an objectionable distortion of tone rendition because, as stated above, for scenes having high average brightness content the reproduced black level moves to the blacker-than-black region and all details in the dark portion of the original scene are lost. Moreover, scenes having a low average brightness are reproduced in such a manner that the original black regions appear gray and retrace lines may become visible.

Since the increased high light contrast conventionally realized in television receivers lacking a D. C. restoration circuit is pleasing to the observer's eye, it would be very desirable to provide this contrast effect in a circuit also having a stabilized black level so that increased high light contrast would be accompanied with good tone rendition.

Accordingly, it is an object of the present invention to provide an improved system for effecting desirable reproduction contrast.

It is also an object of the present invention to provide an improved system for dynamically increasing contrast without overloading a power limited source of cathode ray tube second anode current.

It is a further object of the present invention to provide means for maintaining a stabilized black level and a varying maximum available peak white level which increases with a decrease in average image brightness without overloading the high voltage power source whereby good tone rendition is maintained in the black and gray picture regions along with increased average contrast.

It will be understood as the description proceeds that the invention is not confined to use with the particular type of amplifier combination shown herein, nor is the invention restricted to use with the particular D. C. restorer circuits to be described, but rather the information is of general utility, and any amplifier circuit or D. C. restoration circuit may be used in conjunction with my novel combination.

In order to describe my invention I show, in one embodiment, a series compensated video amplifier circuit directly coupled to a cathode ray tube input circuit. Normally direct coupling would eliminate the necessity of black level stabilization between the last stage of video amplification and the cathode ray tube input circuit. However, my novel circuit inherently changes the black level of the signal, thereby requiring an additional black level stabilization means, as will be more fully explained by later references to the illustrated circuits and accompanying curves. Briefly, my novel circuit comprises an amplifier into the control grid of which a composite television signal is fed. I provide means for controlling the gain of the amplifier as a function of the average brightness of the video signal, thereby dynamically controlling the contrast. The dynamic control of amplifier gain forces the amplifier to apply an amplification factor to signals of high average brightness which is different from the amplification factor applied to signals of low average brightness and included high light peak components. More specifically, image signals having a low average brightness and included high light components operate on a relatively steep transfer characteristic curve, which increases the signal reproduction contrast. However, because of the dynamic gain control circuit, image signals having a high average brightness are forced to operate on a different transfer characteristic curve which limits the peak brightness, thereby insuring a safe high voltage power supply loading factor and thereby protecting the phosphor surface of the cathode ray tube screen during these periods of high cathode ray tube second anode current demand.

It is to be noted that the explanation which follows assumes a signal wave form which varies only as a function of picture brightness. In other words, for purposes of the following explanation, it is to be assumed that the signal wave form does not vary, due to attenuation changes in the transmitting path.

For a better understanding of the present invention, together with other and further objects, advantages and capabilities thereof, reference is made to the following disclosure and appended claims, in connection with the accompanying drawings, in which:

Since the advent of intercarrier sound, the transmitted signal levels of the composite television signal have undergone a slight change to aid intercarrier reception. Though the actual standard has not been changed, as a practical matter adjustments have been made in the modulation levels at the majority of transmitters, so that there is always a residual carrier component, necessary for intercarrier sound receivers which is present above the zero carrier level and below the peak white picture component. As long as transmitters do not maintain their modulation level at standard values, it may be preferable to use a white clamping D .C. restorer in lieu of a sync peak level clamping type, because a clamping circuit which is tied to the white level is actually tied to one of the picture components, whereas the conventionally used sync peak level clamping circuit does not clamp any picture component to a constant level. When the contrast control is adjusted in a circuit using a white level clamper, there is an advantage not present in receivers using sync peak clampers in that the white level obviously remains constant and the black level is adjusted or can be adjusted so as to appear in the black range on the television screen.

Figure 1:
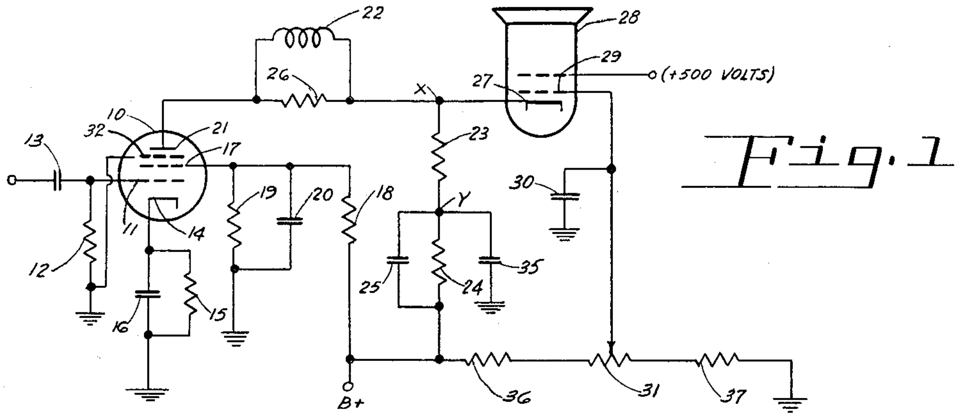
Fig. 1 is a circuit diagram showing a stage of video amplification embodying the present invention.

In Fig. 1, capacitance 13, resistance 12 and grid 11 constitute a conventional grid cathode white clamping D. C. restorer circuit, along with cathode 14 of amplifier 10 which is connected through cathode resistance 15 and a by-pass capacitance 16 to a point of constant potential shown herein as ground. The D. C. degenerative effect of resistance 15 and the drop in screen grid potential protects amplifier 10 from overloading in the absence of an input signal. Screen grid 17 is coupled to a power source, which in the instant embodiment is a tap on the voltage divider comprising resistances 18 and 19. Screen grid 17 is also connected to ground through capacitor 20. Resistor 18 and capacitor 20 form a portion of the screen grid network having a time constant greater than the order of the "field" frequency, the operation of which will hereinafter be more fully described. The anode 21 of tube 10 is connected through a conventional peaking coil 22, which is damped by resistance 26, and through resistances 23 and 24 to a source of plate potential. Resistance 24 is connected in parallel with condenser 25 and through condenser 35 to ground thereby forming a second time constant circuit, the function of which will hereinafter be described. The junction between plate load resistance 23 and series peaking inductor 22 is directly connected to the cathode 27 of cathode ray tube 28 while the cathode ray tube grid 29 is video frequency by-passed to ground through condenser 30, and D. C. biased above ground by potentiometer 31 in conjunction with a power source B+ and resistors 36 and 37. Suppressor grid 32 of tube 10 is conventionally coupled to ground.

In the circuit of Fig. 1, when a predominantly white picture signal, "white" being positive relative to "black," is fed to the cathode ray tube, the magnitude of plate current flowing in tube 10 is controlled by the amplitude and shape of the input signal as well as the magnitude of the voltage impressed upon screen grid 17. As the signal goes positive on grid 11, additional plate current flows between anode 21 and cathode 14. Also, more screen grid current flows between screen 17 and cathode 14, thereby causing a voltage drop at the center tap of voltage divider 18—19 from which the screen grid potential is supplied. The screen grid potential is made to be a function of the average input signal amplitude by using high resistance values for resistance element 18—19. In a conventional video amplifier wherein it is necessary to amplify D. C. components as well as A. C. components, the resistance values of 18 and 19 are conventionally made very low so that any change in impedance of the screen grid-cathode path has little, if any, effect upon the D. C. potential at the screen grid terminal. In my circuit I depart from conventional practice and provide relatively high value resistors in the screen voltage supply whereby a drop in the impedance value of the internal path between the screen grid 17 and cathode 14 causes a drop in potential at the screen grid terminal. Also, by selecting a condenser 20 of the proper value I provide a time constant network in the screen grid supply circuit which has a large period compared to "field" frequency and which causes the screen grid bias potential to vary as an inverse function of the average amplitude of the input signal, making the dynamic screen grid potential decrease, as the average amplitude of the input signal increases. Obviously, this change in screen grid potential also dynamically varies the gain of amplifier 10.

In other words, in the circuit of Fig. 1, the screen grid 17 is supplied from a high impedance bleeder, so that the screen grid voltage decreases with increasing screen grid current. Screen grid current, which is a function of control grid voltage, in turn is a function of picture component brightness. Therefore, a white picture scene having high average brightness, draws a heavy screen grid current, thereby decreasing the screen grid potential and thereby decreasing the gain. Likewise, a picture having low average brightness, draws less screen grid current, thereby allowing the screen grid potential to rise and thereby increasing gain and thus output signal contrast.

Figure 3:
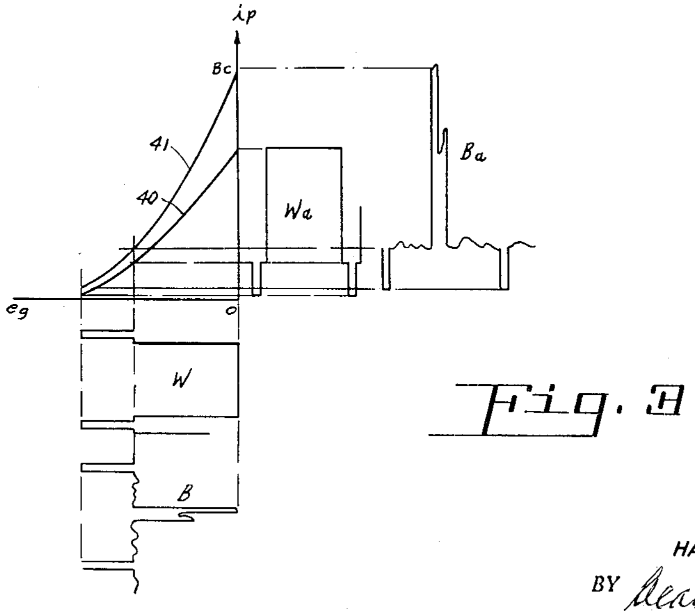
Figs. 3 and 6 are curves used in explaining circuit operation of Fig. 1 and Fig. 2.
Figures 5, 6:
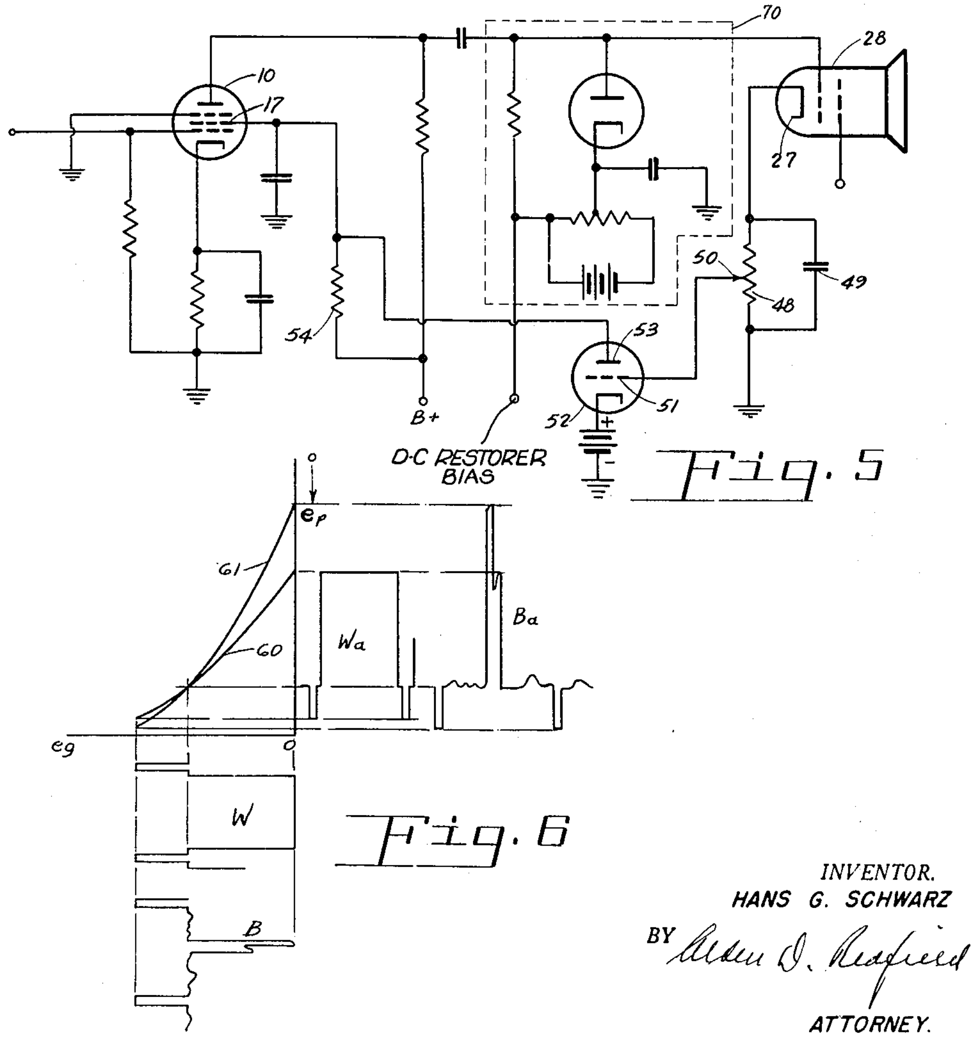
Fig. 5 shows another embodiment of the invention.

It is to be noted here that in addition to the fact that the video signal voltage must change continuously with the variations in brightness of individual picture elements, the signal must have an average voltage level that corresponds to the average brightness of the original scene. This average is for complete frames or fields and not individual lines in the frame. Therefore, the following explanation of circuit operation is to be considered starting with the assumption that curve W of Fig. 3 and Fig. 6 represents a single line component in an all white image scene, and curve B of Fig. 3 and Fig. 6 represents a single line component in an image scene having a low average brightness or dark background. Thus, curves W and B do not necessarily represent video signal components which are adjacent in time, but do represent video signal line components of two separate image scenes, which scenes may or may not be adjacent in time. The importance of this necessary assumption will become clear when the time constant of the screen grid network is considered.

Assuming that curve W is a single line component of an all white picture, it can be seen that the screen grid time constant network will have attained a charge proportional to the average signal level of the prior line component signals. Therefore, the resultant potential impressed on screen grid 17 is relatively low, making the gain of amplifier tube 10 also relatively low. Under this operating condition the $e_g/i_p$ characteristic curve of tube 10 can be considered to be ideally shown by curve 40 of Fig. 3, and the plate current flowing in tube 10 under the influence of input signal W is similar to the plate current shown by $W_a$. Also assuming that curve B is a single line of a predominantly black picture, it can be seen that the prior lines in the picture could not lower the screen grid potential charge to as low a value as would result from amplification of an all white picture scene because the average signal level or deviation from the black level of the picture signal components in a dark picture is relatively low compared to the picture signal components in an all white picture. Therefore, the voltage impressed on screen grid 17 is relatively high and the $e_g/i_p$ characteristic curve of tube 10 under this operating condition is similar to curve 41, signifying the increased gain.

The resulting amplified plate current version of curve B, shown as $B_a$ in Fig. 3, has a higher picture component peak to peak swing than the peak to peak swing of the picture components in the amplified version of curve W, which is curve $W_a$. It can thus be seen that the dynamic gain control in my novel circuit has increased the contrast of the picture component represented by curve B, over and above the contrast provided for the picture component represented by curve W. Since picture components of the type represented by curve W are responsible for the maximum drain on the cathode ray tube second anode power supply source, it is possible to limit the amplification of this type of picture component to a safe limit, as far as second anode current drain is concerned, and at the same time allow signals of the type represented by curve B to draw higher peak second anode current and thus have greater contrast. Thus it can be seen that I provide means for applying a dynamic gain control potential to the gain control electrode of an amplifier having a magnitude which is a function of the average amplitude of the picture component in a television signal, whereby the gain and, therefore, the contrast increases with decreasing average picture brightness.

The action of the dynamic screen grid voltage also shifts the black level of the signal, as can be seen by comparing curves $W_a$ and $B_a$. I also provide circuit means for correcting any undesirable shift in black level, comprising a time constant circuit 24—25. In order to explain how this time constant circuit operates to restore the black level, or stabilize the black level, reference is made to the grid voltage-plate current curves of Fig. 3 and the grid voltage-plate voltage curves of Fig. 6, noting that the plate current for video amplifier 10 is supplied from B+ through the resistance-capacitance network 24—25. In the curves of Fig. 3 which illustrate how the circuit operates without a D. C. stabilization circuit in the output of amplifier 10, it is to be noted that the blanking pulse level or black level of curve W draws less plate current than the black level of curve B. For this reason, point X in the circuit of Fig. 1 normally has a higher potential during the period when the black level of curve W is impressed upon the input circuit of tube 10 than it does during the period when the black level of curve B is impressed upon the input circuit of tube 10. The time constant network 24—25 acts to compensate for this shift and tends to maintain the potential at point X constant during both of these said period, thereby restoring the constant blanking pulse level or constant black level.

As is stated above, not considering the action of the time constant network 24—25, point X has a higher potential during amplification of the black level of curve W because the level of curve W does not draw as much plate current as the black level of curve B. However, the input wave W draws higher average plate current than the input wave B, and the parameters of the time constant circuit comprising capacitance 25 and resistance 24 are so selected as a "recognize" this difference in average brightness level and to maintain a D. C. potential drop at point Y, which is a function of the average plate current flow. Point Y drops in potential, relative to ground when a picture signal having a line component similar to curve W is being amplified, and rises in potential when a picture signal having a line component similar to curve B is amplified. This change in potential at point Y is made equal and opposite to the change in potential at point X, which would be realized in the absence of time constant network 24—25, thereby causing the potential of point X relative to ground to have the same potential when the black levels of waves W and B are impressed upon grid 11 of amplifier tube 10.

This action might be easier to explain with reference to the actual effect on the operating characteristics of the amplifier as illustrated by the $e_g/e_p$ curves of Fig. 6. When a white picture scene is being received the time constant circuit 24—25 attains a charge proportional to the average scene brightness which, in this case, is equal to the average level of the picture signal. Point Y drops in average potential relative to the ground because the time constant of resistance 24 and condenser 25 is of an order greater than the "field" frequency and the time constant circuit does not have time to discharge between line components. The decrease in average potential at point Y shifts the amplifier characteristics on the $e_g/e_p$ diagram of Fig. 6. As can be seen, curve 60, which is the operating curve used for amplifying the white picture component W, shifts relative to curve 61, which represents the amplifier characteristic used to amplify the black component B until it intersects curve 61 at a given point. By selecting the time constant network 24—25 correctly, the intersection of all of the $e_g/e_p$ characteristic curves, utilized over the entire range of dynamic gain control potential, can be made to intersect at the black level or sufficiently close to the black level of the input signal, and the black level made stable and independent of amplifier gain.

Figure 2:
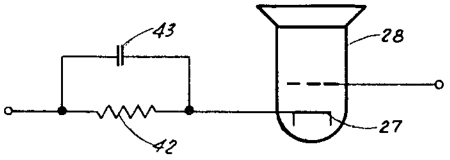
Fig. 2 shows an interstage black level stabilization means which might be necessary in connection with the circuit of Fig. 1.

In Fig. 2 a second black stabilization means is shown comprising resistance 42 and condenser 43 connected to the cathode 27 of cathode ray tube 28. This type of connection is of utility in circuits using an amplifier which is similar to tube 10 but which has a plate voltage rating below available receiver supply potentials. In that case, resistance 24 may be increased to such an extent as to overcompensate, as far as the black level of the output signal is concerned. By overcompensation I mean that the potential at point X in Fig. 1 drops too low when the black level of a white picture is being amplified in lieu of being too high, as previously explained. Thus, when a signal of high average brightness is fed to cathode 27 through network 42—43, the large second anode current flowing through cathode 27 and network 42—43 charges up condenser 43 and raises the potential on cathode 27. This rise in potential is in the degenerative sense, relative to electron flow in cathode ray tube 28; therefore, it is the equivalent of raising the potential at point X and stabilizing black for all signals.

Figure 4:
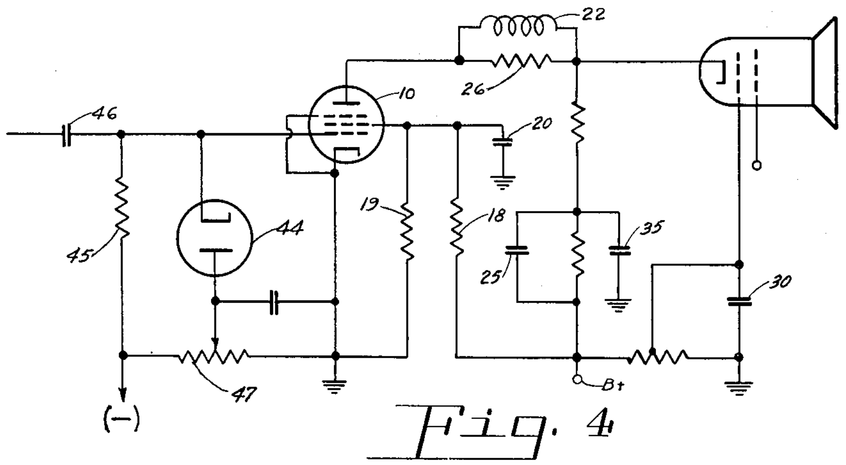
Fig. 4 shows a modification of the circuit of Fig. 1.

In Fig. 4 a third embodiment is shown which differs from the circuit of Fig. 1 in that the input signal to tube 10 is clamped to black in lieu of white by using a conventional black clamping D. C. restorer circuit comprising diode 44, resistance 45, capacitor 46 and potentiometer 47. The remainder of the circuit is similar to the circuit of Fig. 1 and since D. C. restorers, both white clamping and black clamping, are well known to those skilled in the art, the explanation of circuit operation given for Fig. 1 should suffice.

In Fig. 5 another embodiment is shown using a white clamping D. C. restorer circuit 70 connected to the input grid element of cathode ray tube 28. The cathode 27 of the cathode ray tube is connected through resistance 48 to ground, and condenser 49 is connected across resistance 48 to form a time constant network whose function is to average out the second anode current flowing in the cathode ray tube 28. A potential which is proportional to the voltage maintained across the time constant network 48—49 is fed through potentiometer arm 50 to grid 51 of amplifier tube 52. The anode 53 of amplifier 52 is connected through resistance 54 to a suitable source of plate voltage B+, and the anode 53 is also directly connected to screen grid 17 of amplifier tube 10, which is similar to the amplifier shown in Fig. 1. Amplifier 53 acts as a variable resistance and together with resistance 54 forms a "bleeder" for the screen grid supply potential of tube 10. This circuit differs in one respect from the circuit illustrated in Fig. 1 in that the white level clamping circuit is connected between the output of amplifier 10 and the grid of cathode ray tube 28 in lieu of being connected with the amplifier input circuit. Also, the time constant network 48—49 serves a dual purpose in that it functions to stabilize the black level of the picture signal component, and it is also used as a convenient source of dynamic gain control potential.

A picture signal of high average brightness, e. g., an all white image signal, draws a large amount of second anode current, thereby charging up condenser 49 and raising the potential of cathode 27 relative to ground. Since the potential across network 48—49 is a function of the average brightness of the picture signal, it can be used to control the dynamic gain control potential for screen grid 17. Also, this D. C. signal-degenerative action of network 48—49 acts to stabilize the black level of the picture signal components. Again, the gain of amplifier 10 is controlled as a function of picture signal brightness, resulting in increased contrast without overloading the second anode power supply.

Thus it will be seen with reference to Fig. 1, e. g., that I have provided a television signal-translating system comprising an amplifier 10 having an anode-cathode circuit, and signal input electrode 11, and a gain control electrode 17, a source of television signals coupled to said amplifier input electrode, a potential source B+ coupled across said anode cathode circuit, means 18, 19, 20 and B+ for applying a dynamic gain control potential to said gain control electrode 17, said dynamic gain control potential having a magnitude which is a function of the average level of the picture component in said television signal whereby the gain and, therefore, the contrast increases with decreasing average picture brightness and means 24—25 for stabilizing the black level of said amplifier output signal.

The circuits of Fig .1 and Fig. 4 as illustrated include a D. C. restorer connected to the input of the video amplifier. The D. C. restorer circuit is not required, of course, if the source signal has a satisfactory D. C. component, e. g., where the input of the video amplifier is D. C. coupled to the second detector output. As for other modifications, it may become desirable to use my novel gain control system in combination with an amplifier having a transfer characteristic which varies with gain. I am also fully aware that my dynamic control potential could be used to control the I. F. or R. F. amplifier stages in lieu of the detected signal as I have illustrated. This could be accomplished, e. g., by controlling the gain of an AGC amplifier or, more directly, by applying my control potential as grid bias to the R. F. or I. F. stages. These modifications comprise other and separate species of my generic invention.

While I do not desire to be limited to any specific circuit parameters, such parameters varying in accordance with the individual circuit requirements, the following circuit values have been found entirely satisfactory in one successful embodiment of the invention, in accordance with Fig. 1.

| | | | |
|---|---|---|---|
| Condenser: | | | |
| | 13 | microfarad | .1 |
| | 16 | do | 1000 |
| | 20 | do | 4 |
| | 25 | do | 40 |
| | 30 | do | .1 |
| | 35 | do | .001 |
| Resistance: | | | |
| | 12 | megohms | 1.2 |
| | 15 | ohms | 100 |
| | 18 | do | 82,000 |
| | 19 | do | 120,000 |
| | 23 | do | 4,700 |
| | 24 | do | 12,000 |
| | 31 | do | 250,000 |
| | 36 | do | 270,000 |
| | 37 | do | 330,000 |
| Tube 10 | | | 6CB6 |
| B+(in Fig. 1) | | volts | 345 |

While there has been shown and described what is at present considered the preferred embodiment of the present invention, it will be obvious to those skilled in the art that various changes and modifications may be made therein without departing from the scope of the appended claims.

Having thus described my invention, I claim:

1. In a television receiver, the combination comprising an amplifying stage having a vacuum tube comprising a cathode, an anode, a screen grid, and a control electrode, said cathode being connected in series with a point of reference potential; a soure of composite television signals coupled to feed the cathode-control electrode circuit of said amplifying stage, said television signals including picture components, which vary as a function of image brightness and positive-going line and field sync components; a kinescope having a control grid and a cathode circuit; means coupling the anode-cathode output circuit of said amplifying stage to feed the control grid of said kinescope with composite television signals having positive going white and negative going black picture components; a time-constant network comprising a parallel connected resistance and capacitance direct-circuit con-nected between cathode of said kinescope and said point of reference potential for supplying a voltage varying as a function of the average brightness value of the television signal picture components across the resistance element of said network, the time constant of said network being on the order of twice the television signal field period; and means for utilizing the control voltage across the resistance element of said network to control the gain voltage of said amplifying stage as an inverse function of the average brightness value of the television signal picture component, the last-named means comprising a phase-reversing network having as its input terminals said point of reference potential and a point on said resistance and as its output terminals said point of reference potential and said screen grid.

2. In a television receiver the combination comprising an amplifying stage having a vacuum tube comprising a cathode, an anode, a screen grid and a control electrode, said cathode being connected in series with a point of reference potential; a source of composite television signals coupled to feed the cathode control electrode circuit of said amplifying stage, said television signals including picture components, which vary as a function of image brightness and positive-going line and field sync components; a kinescope having a control grid and a cathode circuit; means coupling the anode-cathode output circuit of said amplifying stage to feed the control grid of said kinescope with composite television signals having positive going white and negative going black picture components; a time-constant network comprising a parallel connected resistance and capacitance direct-circuit connected between the cathode of said kinescope and said point of reference potential for supplying a voltage varying as a function of the average brightness value of the television signal picture components across the resistance element of said network, the time constant of said network being on the order of twice the television signal field period; and means coupling the resistance element of said network to the gain control circuit of said amplifying stage for controlling the gain voltage of said amplifying stage as an inverse function of the average brightness value of the television signal picture component, the last-named means comprising a phase-reversing tube having anode and cathode and control electrodes, a connection from said resistance element to the last-named control electrode, a connection from the last-named anode to said screen grid, and a source of cathode-bias potential between the cathode of said phase-reversing tube and said point of reference potential.

References Cited in the file of this patent

UNITED STATES PATENTS 2,356,141 Applegarth ------------ Aug. 22, 1944

OTHER REFERENCES

"Rider's Television Manual," vol. 4, Belmont TV, pages 4–5, November 25, 1949.